US009073516B2

(12) United States Patent
Schwindaman et al.

(10) Patent No.: US 9,073,516 B2
(45) Date of Patent: Jul. 7, 2015

(54) LEVELING JACK FOR VEHICLE (75) Inventors: Michael A. Schwindaman, Cassopolis, MI (US); Thomas J. Rogers, Cassopolis, MI (US); Michael W. Howard, Elkhart, IN (US)

(73) Assignee: LIPPERT COMPONENTS MANUFACTURING INC., Elkhart, IN (US)

( * ) Notice: Subject to any disclaimer, the term of this patent is extended or adjusted under 35 U.S.C. 154(b) by 937 days.

(21) Appl. No.: 12/683,335

(22) Filed: Jan. 6, 2010

(65) Prior Publication Data
US 2011/0024706 A1 Feb. 3, 2011

Related U.S. Application Data (60) Provisional application No. 61/205,668, filed on Jan. 22, 2009.

(51) Int. Cl.
| *B66F 7/10* | (2006.01) |
| *B66F 3/24* | (2006.01) |
| *B60S 9/12* | (2006.01) |
| *B66C 23/80* | (2006.01) |
| *B66F 3/25* | (2006.01) |
| *B66F 3/44* | (2006.01) |
| *B66F 3/42* | (2006.01) |

(52) U.S. Cl.
CPC .... *B60S 9/12* (2013.01); *B66F 3/24* (2013.01); *B66F 3/42* (2013.01); *B66C 23/80* (2013.01); *B66F 3/25* (2013.01); *B66F 3/44* (2013.01)

(58) Field of Classification Search
CPC .................... B60S 9/00; B66F 3/00
USPC ...... 254/903, 89 R, 89 H, 92 R, 93 VA, 93 H, 254/45, 418, 423
See application file for complete search history.

(56) References Cited

U.S. PATENT DOCUMENTS

| 3,185,043 A | 5/1965 | Dunham |
| 3,362,683 A | 1/1968 | Hansen |
| 3,614,064 A | 10/1971 | Bennett |
| 3,627,348 A * | 12/1971 | Klees ........................ 280/6.159 |

(Continued)

FOREIGN PATENT DOCUMENTS

| BR | 6200454 U | 11/1983 |
| DE | 202005005598 U1 | 6/2005 |

(Continued)

OTHER PUBLICATIONS

European Search Report issued in EP Pat. Appl. No. 10189708 dated Jan. 22, 2014.

*Primary Examiner* — Lee D Wilson
*Assistant Examiner* — Seahee Yoon
(74) *Attorney, Agent, or Firm* — Barnes & Thornburg LLP (57) ABSTRACT

A leveling jack for a vehicle, such as a recreational vehicle, includes a leveling piston and cylinder, a bi-directional, reversible pump, and a reservoir within a common sealed housing that does not require exterior fluid connections. The piston is extended from the housing to contact the ground and effect leveling by operating the pump in one direction, and is retracted into the cylinder by operating the pump in the other direction. Accordingly, the leveling jack is a self-contained unit, and does not require a central hydraulic unit and the necessary hoses between the jack and the central hydraulic unit as needed in the prior art.

19 Claims, 8 Drawing Sheets

(56) References Cited

U.S. PATENT DOCUMENTS

| | | | |
|---|---|---|---|
| 3,650,182 A | 3/1972 | Phillips | |
| 3,656,778 A | 4/1972 | Bristol | |
| 3,857,582 A | 12/1974 | Hartog | |
| 4,061,309 A * | 12/1977 | Hanser | 254/423 |
| 4,165,861 A | 8/1979 | Hanser | |
| 4,216,939 A | 8/1980 | Valdespino | |
| 4,235,542 A * | 11/1980 | Paterik, Jr. | 254/423 |
| 4,532,151 A | 7/1985 | Stenlund | |
| 4,597,584 A | 7/1986 | Hanser | |
| 4,667,932 A | 5/1987 | Arbeloa | |
| 4,711,428 A | 12/1987 | Carpenter | |
| 4,743,037 A | 5/1988 | Hanser | |
| 4,746,133 A | 5/1988 | Hanser et al. | |
| 4,813,519 A * | 3/1989 | Matsubara et al. | 188/266.4 |
| 4,815,711 A | 3/1989 | Bruno et al. | |
| 5,842,911 A | 12/1998 | Weber | |
| 6,044,752 A | 4/2000 | Harigaya | |
| 6,089,603 A | 7/2000 | Ackley | |
| 6,415,876 B1 | 7/2002 | Bollinger et al. | |
| 6,637,315 B2 | 10/2003 | Mickelson | |
| 6,722,635 B2 | 4/2004 | Erickson | |
| 7,296,784 B2 * | 11/2007 | Peter | 254/418 |
| 7,568,562 B2 * | 8/2009 | Beck | 188/313 |
| 2004/0040806 A1 * | 3/2004 | Oliver et al. | 188/315 |
| 2005/0051398 A1 * | 3/2005 | Baba | 188/315 |

FOREIGN PATENT DOCUMENTS

| | | |
|---|---|---|
| EP | 1232993 A1 | 8/2002 |
| JP | 2008309212 A | 12/2008 |
| WO | WO 98/38431 | 3/1998 |

* cited by examiner

LEVELING JACK FOR VEHICLE

CROSS REFERENCE TO RELATED APPLICATIONS

This application claims domestic priority based upon U.S. Provisional patent application Ser. No. 61/205,668, filed Jan. 22, 2009, the disclosure of which is hereby incorporated by reference.

BACKGROUND OF THE INVENTION

1. Field of the Invention

This invention relates to a leveling and stabilization system for a motor vehicle, such as a recreational vehicle.

2. Description of the Background of the Invention

When a recreational vehicle is parked for use, it is desirable that the vehicle be leveled and stabilized for the convenience of the inhabitants. Accordingly, it has become common to provide stabilization and leveling systems for recreational vehicles. Commonly, these systems provide multiple leveling jacks (usually four) located on opposite corners of the vehicle. A centralized hydraulic system mounted within the vehicle is used to effect leveling and stabilization. The centralized hydraulic system includes a pump, reservoir, and appropriate hydraulic lines connecting the pump to the jacks located at each corner of the vehicle. Such systems are shown in U.S. Pat. Nos. 4,061,309; 4,165,861; 4,597,584; 4,743,037 and 4,746,133. In addition to the foregoing, which disclose hydraulic leveling systems, electric leveling jacks have also been used, as shown in U.S. Pat. No. 6,722,635.

The hydraulic leveling systems using a centralized hydraulic system are relatively complex in construction and operation, and are costly to install and maintain. Furthermore, hydraulic lines connecting the pump to the jacks are exposed to damage on the exterior of the vehicle. Furthermore, the pump, hydraulic manifold, hydraulic valves (usually four or more), all hydraulic hose assemblies and fittings, pressure switches, wiring harness, etc., are relatively bulky and the space needed inside the vehicle to house the centralized hydraulic system used is not insignificant. In addition, the centralized hydraulic system requires the user to top off hydraulic fluid and to bleed air from the system.

SUMMARY OF THE INVENTION

The present invention provides a leveling jack for leveling and stabilizing a vehicle of the above-described type in which a leveling cylinder, a pump, and a fluid reservoir are all sealed within a common housing. It is contemplated that four of these jacks will be used as described above; however, since each of the jacks is a sealed unit, no hoses or fittings are necessary to connect the jacks to a centralized hydraulic system, and since both the pump and reservoir are within each sealed unit, the hydraulic manifold, centralized pump, and centralized reservoir are not needed. The piston within the housing of the present invention includes a piston rod which extends from the housing to engage the ground surface (the housing itself is mounted on the surface of the body of the vehicle) the pump is a reversible, bi-directional pump that extends the piston rod from the housing when the pump is operating in one direction and retracts the piston rod into the housing when the pump is operating in the reverse direction. According to a second embodiment of the invention, a second adult single-acting piston includes a rod extending from the housing to engage ground surface and a spring which retracts the rod.

DETAILED DESCRIPTION OF INVENTION

Referring now to FIGS. 1-5 of the drawings, the leveling jack 10 includes a housing 12 consisting of a leveling cylinder 14, a pump unit 16, and an end cap 18 extending between the leveling cylinder 14 and the pump unit 16. Although the leveling cylinder 14, pump unit 16, and end cap 18 are illustrated as separate components, housing 12 may be made as a single cast unit. Leveling cylinder 14 is defined by a circumferentially extending outer wall 20 which slidably receives a piston 22, to which a piston rod 24 is attached, which extends out of lower end 26 of the leveling cylinder 14. The end of the piston rod 24 extending out from the housing is attached to a ground engaging plate 28, which rests on ground when the leveling jack is used. A mounting bracket 30 is attached to the outer surface of the outer wall 20, and is aperatured to facilitate attachment to an exterior surface of a vehicle, such as a recreational vehicle, which uses the leveling jack 10. The exterior surface is defined herein as a first surface, and the ground is defined as a second surface.

The cap 18 is attached to the top of the leveling cylinder 14 by bolts 32, 34, and 36. Bolts 32 and 34 are conventional, but bolt 36 is provided with a transverse passage 38 which intersects with longitudinal passage 40. A passage 42 of about the same diameter as the bolt 36 extends along outer wall 20 and is provided with an opening 43 that extends through the wall 20 to permit fluid communicated through the passage 38 and 40 of the bolt 36 to communicate in the annular retraction chamber 44 defined between the piston rod 24 and the inner circumferential surface of the outer wall 20. Piston 22 cooperates with the end cap 18 to define an extension chamber 46. When fluid pressure is communicated into extension chamber 46, piston 20 and piston rod 24 are urged downwardly viewing the Figures, thereby extending the lower end of piston rod 24 out of the leveling cylinder 14. Conversely, when pressure is communicated into the annular retraction chamber 44, the piston 20 is urged upwardly viewing the Figures, thereby withdrawing the piston rod into the cylinder 14. The pump unit 16 includes a housing or cylinder 48 in which a bi-directional, reversible pump 50 (which will be hereinafter described) and a bi-directional, reversible motor 52 for driving the pump 50 are mounted. The motor 52 is connected to the pump 50 to operate the latter. The pump 50 cooperates with end cap 18 to define a reservoir 54 therebetween. A pair of tubes 56, 58 (only the tube 56 being shown in FIG. 2) extend through the reservoir 54 to communicate the pump 50 to passages 60, 62 (FIG. 3) extending within the end cap 18.

Figure 1:
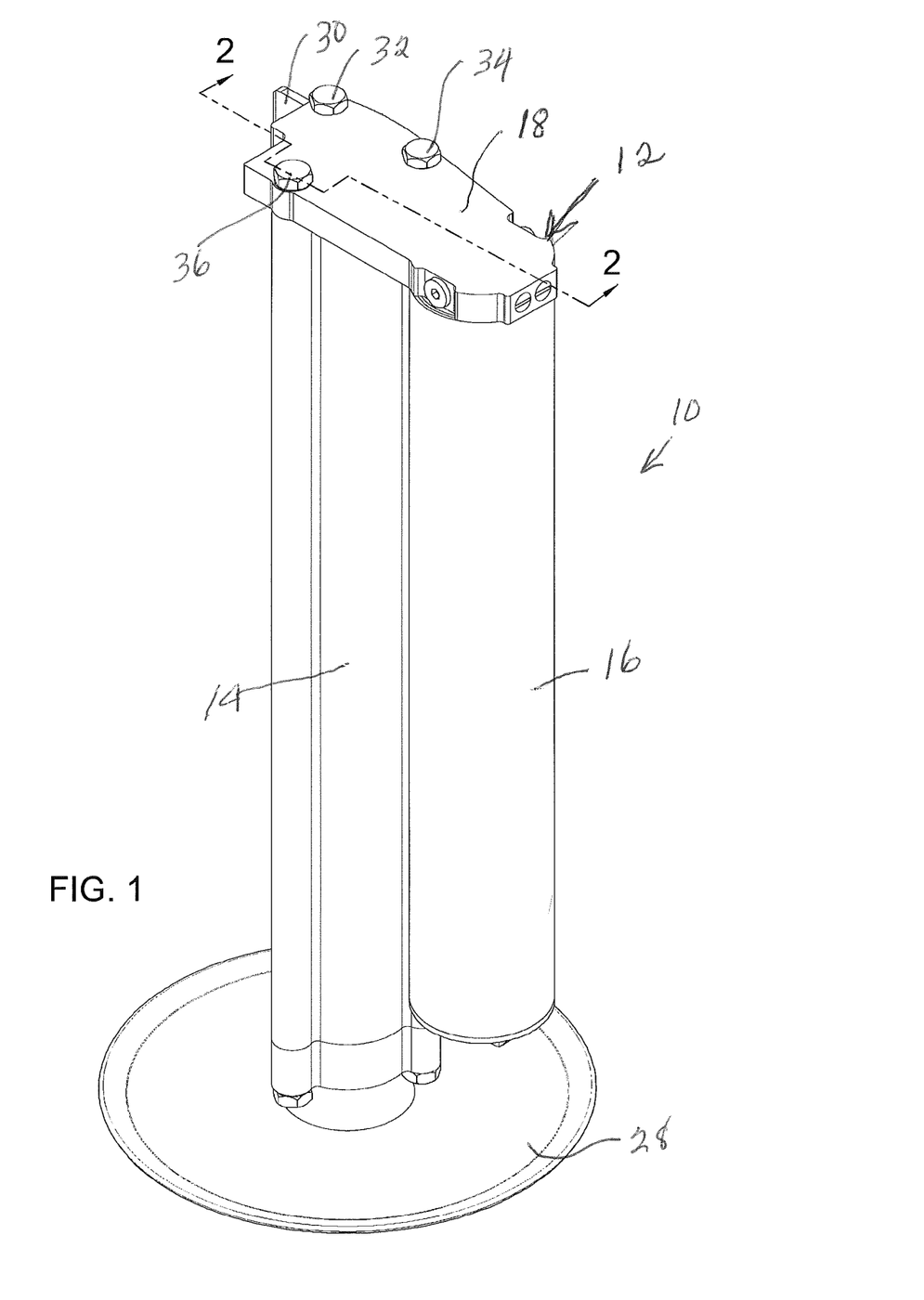
FIG. 1 is a perspective view of a leveling jack made pursuant to the teachings of the present invention.
Figure 2:
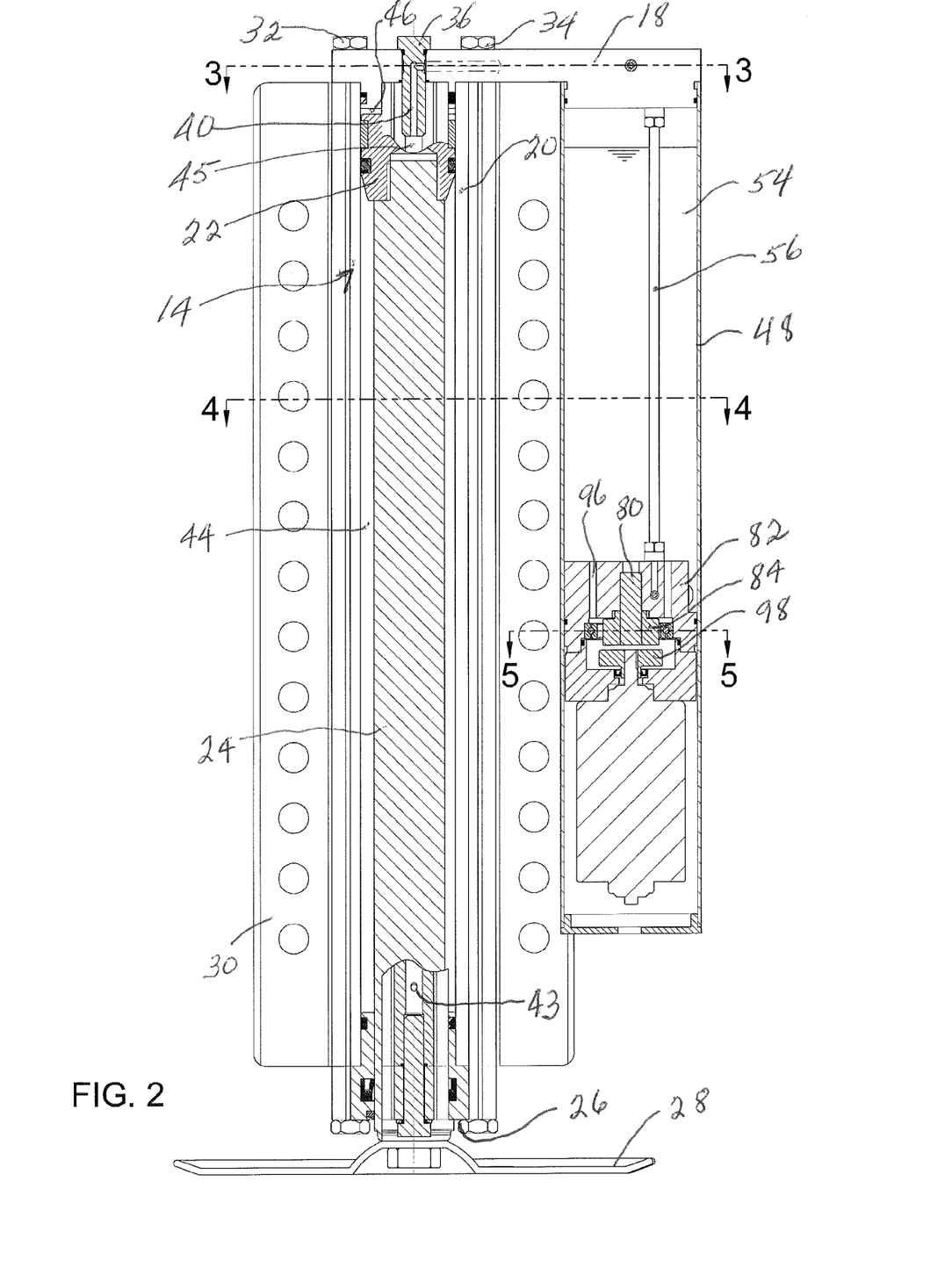
FIG. 2 is a cross-sectional view taken substantially along lines 2-2 of FIG. 1, taken through the piston intermediate the top and bottom portions of the apparatus.
Figure 3:
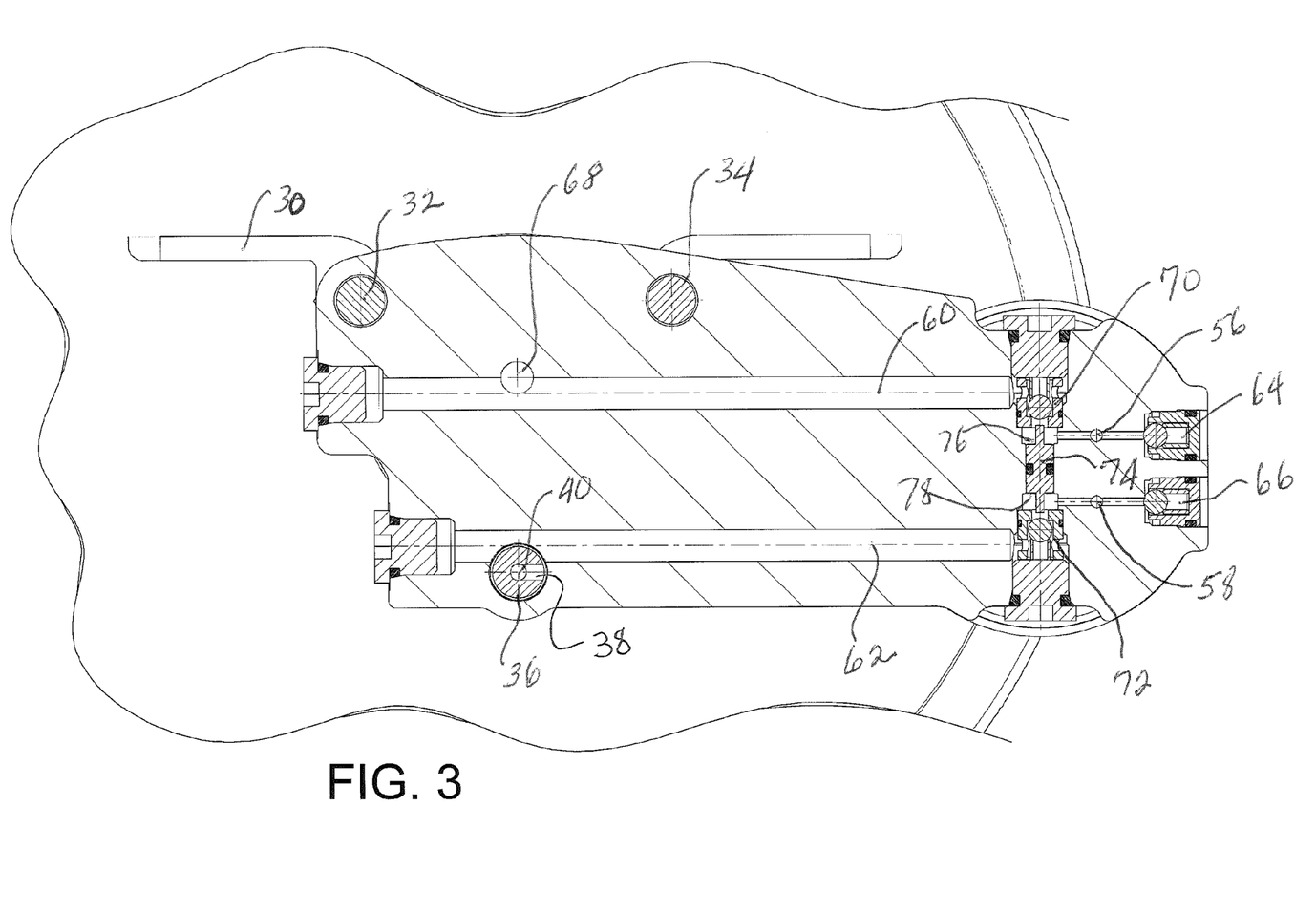
FIG. 3 is a view taken substantially along line 3-3 of FIG. 2.
Figure 4:
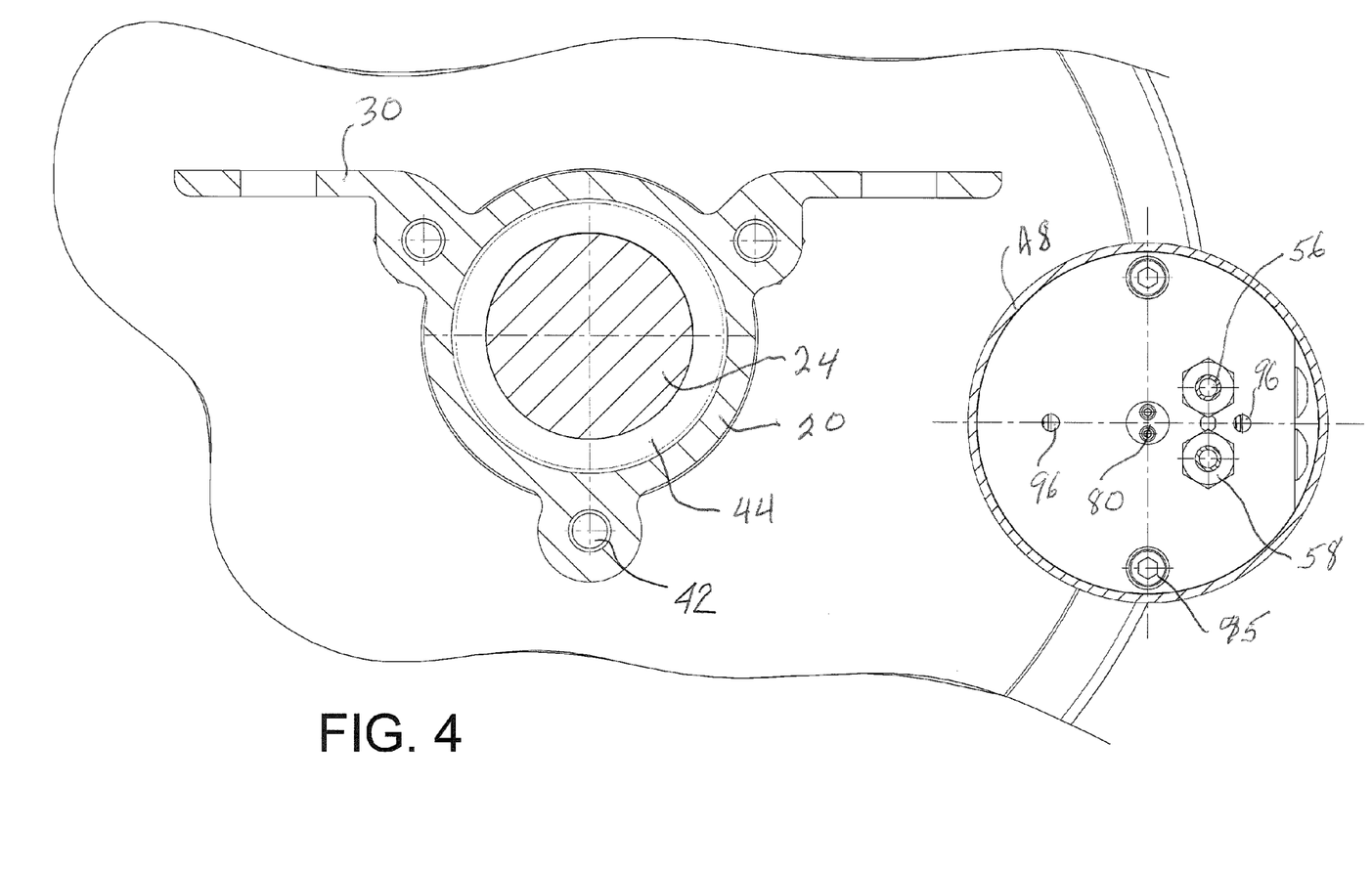
FIG. 4 is a view taken substantially along line 4-4 of FIG. 2.
Figure 5:
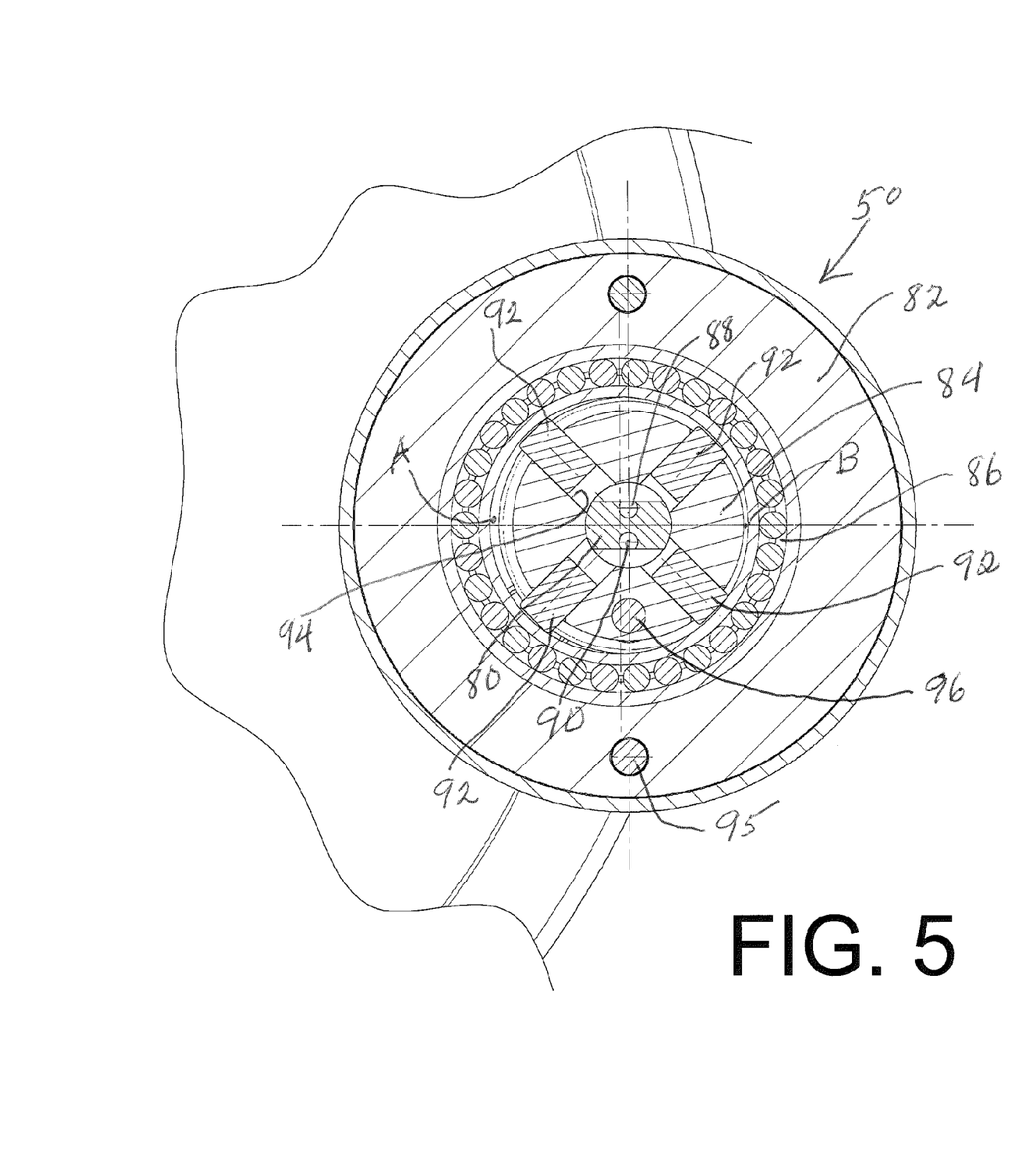
FIG. 5 is a view taken substantially along line 5-5 of FIG. 2.

Relief valves 64, 66 prevent over-pressure in the passages 60, 62. Passage 60 is communicated into the extension chamber 46 through opening 68, and the passage 62 is communicated into the annular retraction chamber 44 through the passages defined within the bolt 36. Check valves 70, 72 are mounted in the passages 60, 62 and permit flow into the corresponding pressure chambers 44, 46, but normally prevent flow from the pressure chambers. Shuttle piston 74 is slidable within a bore extending between the passages 60, 62 and is provided with offset faces 76, 78, which are exposed to the pressure levels in the passages 60, 62 respectively. Accordingly, when passage 60 is pressurized, the shuttle 74 is shifted to hold the check valve 72 open, thereby permitting fluid to vent from the annular retraction chamber 44, and when the passage 62 is pressurized, the shuttle piston 74 shifts to hold the check valve 70 open, thereby permitting fluid to vent from the extension chamber 46.

Referring now to the pump 50, a commutator 80 is non-rotatably mounted in a pump block 82 and is circumscribed by a rotor 84 which is mounted in pump block 82 for rotation relative to the commutator 80. A roller bearing 86 is mounted in the pump block 82 and circumscribes the rotor 84, but the center of rotation of the rotor 84 is offset from the center of the roller bearing 86. Accordingly, the clearance between the rotor and the roller bearing at point A (FIG. 5) is greater than the clearance between the rotor and the rotor bearing at point B, and the clearance tapers between points A and B. Notches 88, 90 are provided in the commutator 80 and are communicated to the tubes 56, 58 respectively. Circumferentially spaced pistons 92 are mounted in corresponding circumferentially spaced bores 94 and slide relative to the rotor. Accordingly, as each piston 92 approaches the point of maximum clearance A, fluid is drawn in through notch 90 and passage 58, and as the rotor continues rotation, the corresponding piston is urged inwardly, toward the commutator, thereby discharging fluid through the corresponding notch 88 and tube 56 assuming rotation in the clockwise direction. The pistons are maintained in contact with the inner race of the bearing 86 by centrifugal force. Accordingly, when the motor is reversed in the opposite (counterclockwise) direction, fluid is drawn in through notch 88 and its corresponding tube and is discharged through notch 90 and its corresponding tube. A pin 95 drives the rotor by its connection with plate 98 that is turned by the motor 52. Passages 96 extend through the pump block 82 to communicate make-up fluid to the rotor 84.

Figure 7:
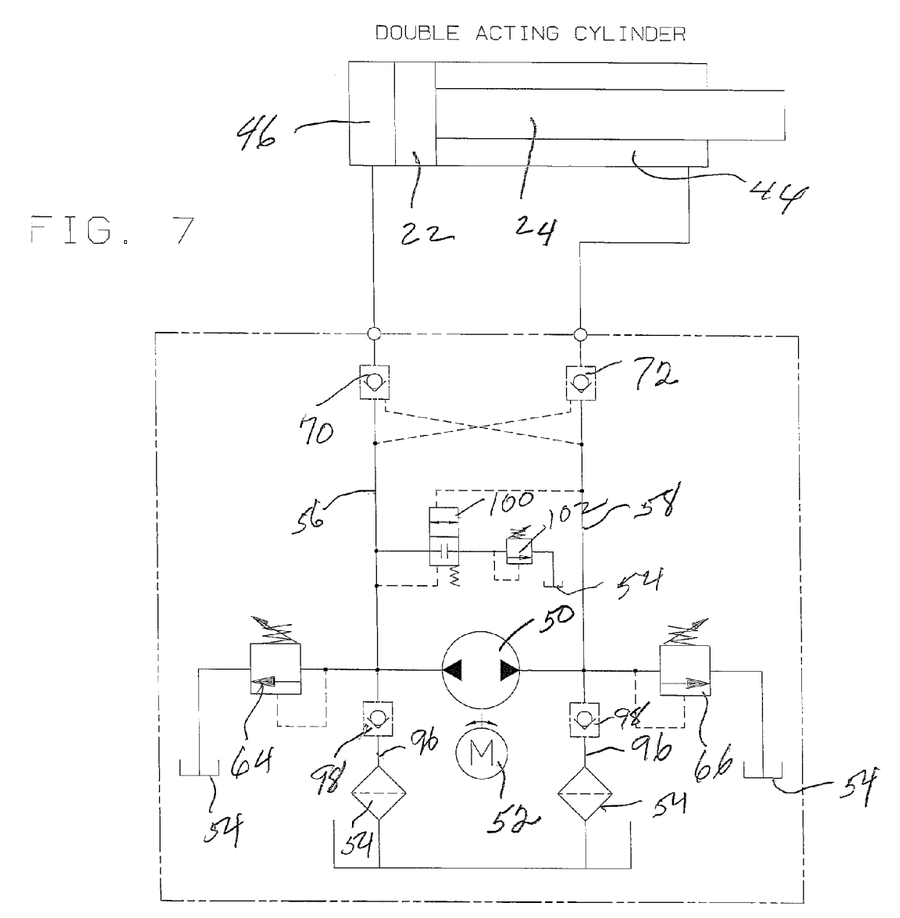
FIG. 7 is a schematic illustration of the hydraulic system used in the embodiment of FIGS. 1-5.
Figure 8:
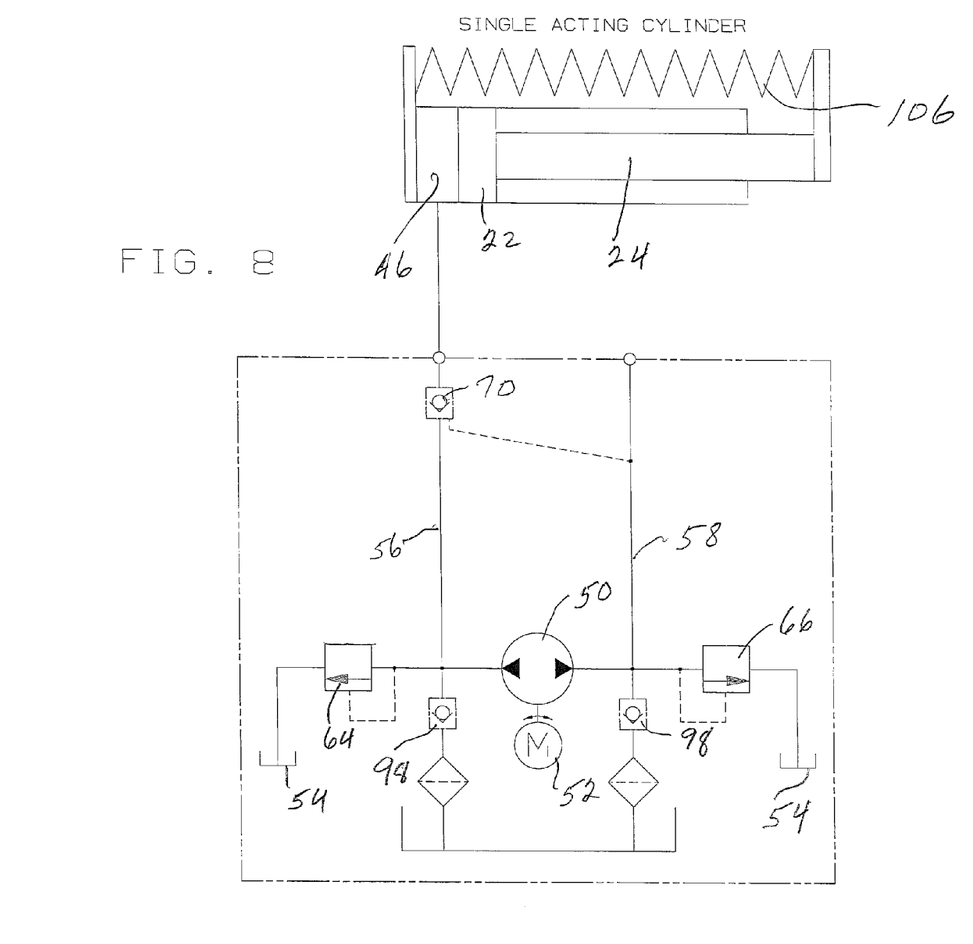
FIG. 8 is a schematic illustration of the hydraulic system used in the embodiment of FIG. 6.

Referring to FIG. 7, operation of the leveling jack is illustrated diagrammatically. The dashed lines connecting the check valve 70 with tube 58 and check valve 72 and tube 56 represent the operation of the shuttle piston 74. Check valves 98 are located in passages 96, but are not shown in other drawings, to permit fluid to be withdrawn from the reservoir 54 by the pump 50 when necessary. A valve 100 connects the tube 56 to reservoir 54 through a relief valve 102. The valve 100 is a pressure operated valve and is connected to the pressure in tubes 56, 58. When the piston 22 is being retracted into the extension chamber 46, a greater amount of fluid is discharged from chamber 46 than is admitted into chamber 44, because of the volume consumed by piston rod 24. Accordingly, when the pressure in tube 58 indicates the chamber 44 is being pressurized, valve 100 is switched to permit communication into the reservoir, but when the pressure chamber 46 is being pressurized, valve 100 is in the position illustrated, blocking communication to the reservoir 54.

Figure 6:
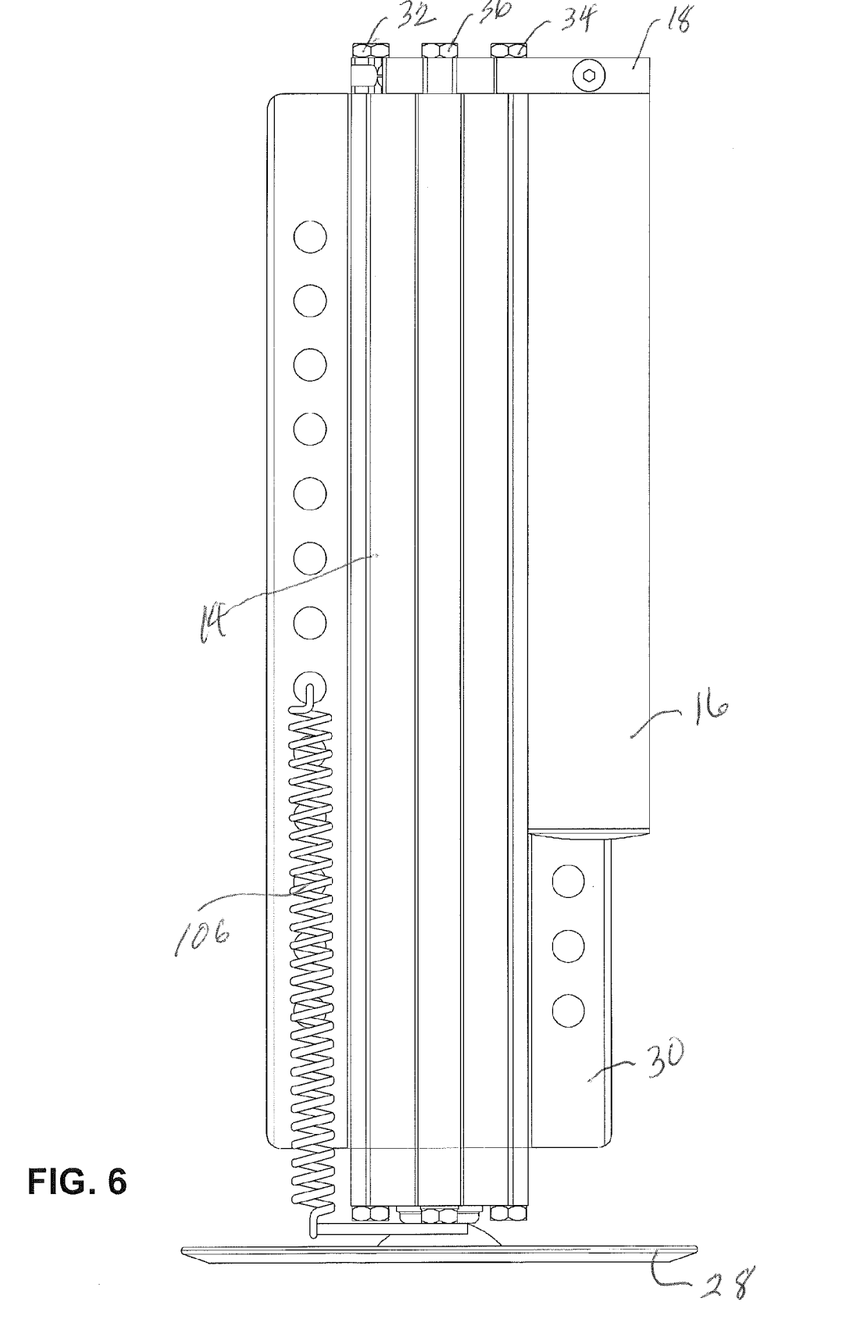
FIG. 6 is a view similar to FIG. 1, but illustrating a different embodiment of the invention.

The embodiment in FIG. 6 is substantially the same as that of FIGS. 1-5, except that a single-acting piston is used instead of the double-acting piston illustrated in FIGS. 1-5. Accordingly, in the embodiment in FIG. 6, the annular chamber 44 is vented to atmosphere, and the piston is returned when pressure in extension chamber 46 is released by a spring 106. Accordingly, tube 58 is stubbed off, and the pump 50, when driven in one direction, pressurizes extension chamber 46 to drive the piston rod outwardly and when the pump is driven in the reverse direction, pressure in tube 58 holds check valve 70 open, thereby releasing the pressure in chamber 46, permitting the spring 106 to withdraw the piston into the housing.

This invention is not limited to the details above, but may be modified within the scope of the following claims.

What is claimed is:

1. A leveling jack for establishing clearance between a first surface and a second surface, said leveling jack comprising a piston, a fluid pump and a fluid reservoir within a sealed housing mountable on one of said surfaces, said piston being slidable in said sealed housing and including a piston rod extending from said housing to engage the other of said surfaces to control the clearance between said first surface and second surface in response to sliding of the piston, said sealed housing comprising internal fluid passages in fluid communication with said pump, said piston and said reservoir without fluid communication into said sealed housing from a source exterior of said sealed housing, and a motor connected to and configured to drive said fluid pump; wherein said sealed housing includes a leveling cylinder defining a bore slidably receiving said piston, said piston rod extending from one end of said bore, said piston cooperating with another end of said bore to define an extension chamber; wherein said pump is mounted in a pump unit defined within said sealed housing, said reservoir being defined within said pump unit; and wherein said pump unit is defined within a housing having an end closed by a cap also closing said another end of said bore, one of said passages being defined in said cap, a check valve mounted within said cap.

2. The leveling jack as claimed in claim 1, wherein said pump is mounted in said pump unit and cooperates with said end of said extension chamber to define said reservoir.

3. The leveling jack as claimed in claim 1, wherein said pump is a reversible pump operable in one direction to pump fluid into said extension chamber through a valve and in a second direction to allow fluid to withdraw from said extension chamber.

4. The leveling jack as claimed in claim 3, wherein said piston is a double acting piston in which said piston rod cooperates with a wall of said sealed housing to define an annular retraction chamber therebetween, said sealed housing including another passage, said another passage in communication with said pump and said annular retraction chamber, said pump when operated in said second direction pumping fluid into said annular retraction chamber and allowing fluid to withdraw from said annular retraction chamber when the pump is operated in said one direction.

5. The leveling jack as claimed in claim 4, including another valve in said another passage to control fluid communication into said annular retraction chamber, and means responsive to fluid pressure in a further passage in communication with the extension chamber to open said another valve when fluid is being pumped into the extension chamber.

6. The leveling jack as claimed in claim 3, wherein said piston is a single acting piston, and including a spring yieldably urging said piston toward said another end of said bore.

7. The leveling jack as claimed in claim 3, wherein said pump is mounted in a pumping chamber defined within said sealed housing, said reservoir being defined within said pumping chamber between said pump and an end of the pumping chamber, said passages including a tube extending through said reservoir.

8. A leveling jack for establishing clearance between a first surface and a second surface, said leveling jack comprising a piston, a reversible fluid pump and a fluid reservoir within a housing mountable on one of said surfaces, said piston being slidable in a bore defined within said housing and including a piston rod extending from the housing to engage the other of said surfaces to control the clearance between said first surface and second surface in response to sliding of the piston, said piston cooperating with one end of the bore to define an extension chamber therebetween, a first fluid passage within said housing in fluid communication with said pump and said extension chamber, a second fluid passage in fluid communication with said extension chamber and with said reservoir, and a first valve within said passages communicating into said extension chamber when the pump is operated in one direction, but preventing communication out of said extension chamber when the pump is operated in said one direction, the leveling jack further comprising a motor connected to and configured to drive said fluid pump; wherein said pump is mounted in a pump unit defined within said housing, said fluid reservoir being defined within said pump unit; and wherein said pump unit is defined within a pump unit housing having an end closed by a cap also closing said one end of said bore, one of said passages being defined in said cap, said first valve mounted within said cap.

9. The leveling jack as claimed in claim 8, wherein a valve operating member responsive to operation of said pump in a second direction opens said first valve to allow communication from said extension chamber to said reservoir when the pump is operated in the second direction.

10. The leveling jack as claimed in claim 8, wherein said piston is a double acting piston cooperating with opposite ends of said bore to define said extension chamber between said piston and one end of said bore and an opposite retraction chamber between said piston and the other end of the bore, said passages including a first branch communicating said pump to said extension chamber and a second branch communicating said pump to the retraction chamber, said first valve being mounted in said first branch.

11. The leveling jack as claimed in claim 10, wherein said first valve controls communication into said extension chamber when the pump is operated in said one direction, and a second valve mounted in said second branch controlling communication into said retraction chamber when the pump is operated in the second direction.

12. The leveling jack as claimed in claim 11, wherein valve control means opens said first valve to allow communication to said reservoir when the pump is operated in said second direction and opens said second valve to allow communication to said reservoir when said pump is operated in said one direction.

13. The leveling jack as claimed in claim 8, wherein said piston is a single acting piston responsive to fluid pressure in said extension chamber to extend said piston rod from said housing, and a spring yieldably urging said piston in a direction retracting said piston into said housing.

14. The leveling jack as claimed in claim 12, wherein said valve control means holds said first valve open to communicate said extension chamber to said reservoir when the pump is operated in the second direction.

15. A leveling jack for establishing clearance between a first surface and a second surface, said leveling jack comprising a housing mountable on one of said surfaces, a piston slidably received in said housing and extending therefrom to engage the other of said surfaces to control the clearance between said surfaces in response to sliding of said piston in said housing, said piston cooperating with said housing to define an extension chamber therebetween, a reversible fluid pump and a reservoir in communication with said extension chamber, a first valve in communication with said extension chamber and with said pump but preventing communication out of said extension chamber when the pump is operated in said one direction, and a valve operating member responsive to operation of said pump in a second direction to open said first valve to allow communication from said extension chamber to said reservoir when the pump is operated in the second direction, the leveling jack further comprising a motor connected to and configured to drive said fluid pump; wherein said pump is mounted in a pump unit defined within said housing, said reservoir being defined within said pump unit; and wherein said pump unit is defined within a pump unit housing having an end closed by a cap also closing said one end of said housing receiving said piston, said first valve mounted within said cap.

16. The leveling jack as claimed in claim 15, wherein said piston is a double acting piston cooperating with opposite ends of a bore to define said extension chamber between said piston and one end of said bore and an opposite retraction chamber between said piston and the other end of the bore, a passage including a first branch containing said first valve and in communication with said pump and said extension chamber and a second branch in communication with said pump and the retraction chamber, and a second valve in said second branch communicating with said pump and with the retraction chamber when the pump is operated in the second direction, said valve operating member acting on said second valve to permit communication from the retraction chamber when the pump is operated in said one direction.

17. The leveling jack as claimed in claim 15, wherein said piston is a single acting piston responsive to fluid pressure in said extension chamber to extend a piston rod from said housing, and a spring yieldably urging said piston in a direction retracting said piston rod into said housing.

18. The leveling jack as claimed in claim 17, wherein said valve operating member holds said first valve open to communicate said extension chamber to said reservoir when the pump is operated in the other second direction.

19. The leveling jack as claimed in claim 3, further including means for holding said valve open when said pump is operated in the second direction.

* * * * *

UNITED STATES PATENT AND TRADEMARK OFFICE
CERTIFICATE OF CORRECTION

PATENT NO. : 9,073,516 B2
APPLICATION NO. : 12/683335
DATED : July 7, 2015
INVENTOR(S) : Michael A. Schwindaman Page 1 of 1

It is certified that error appears in the above-identified patent and that said Letters Patent is hereby corrected as shown below:

In The Claims claim 18, at column 6, line 53, delete the word "other" before the word "second".

Signed and Sealed this
Eighth Day of December, 2015

Michelle K. Lee
*Director of the United States Patent and Trademark Office*